UNITED STATES PATENT OFFICE.

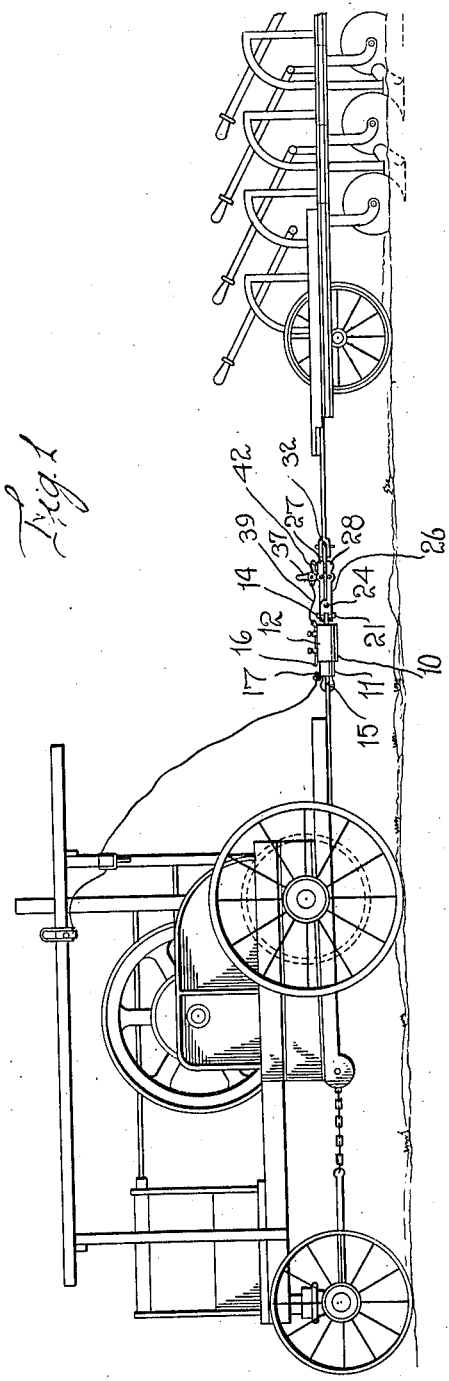
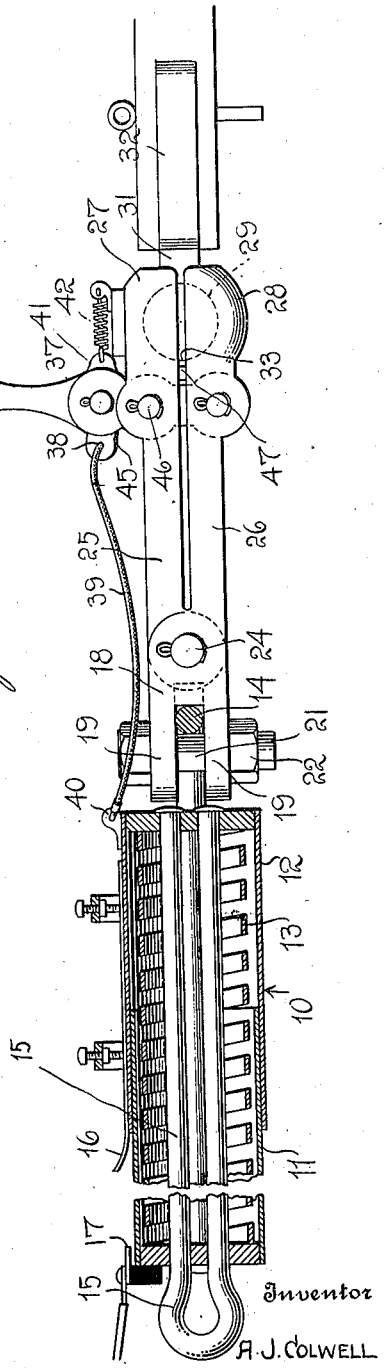

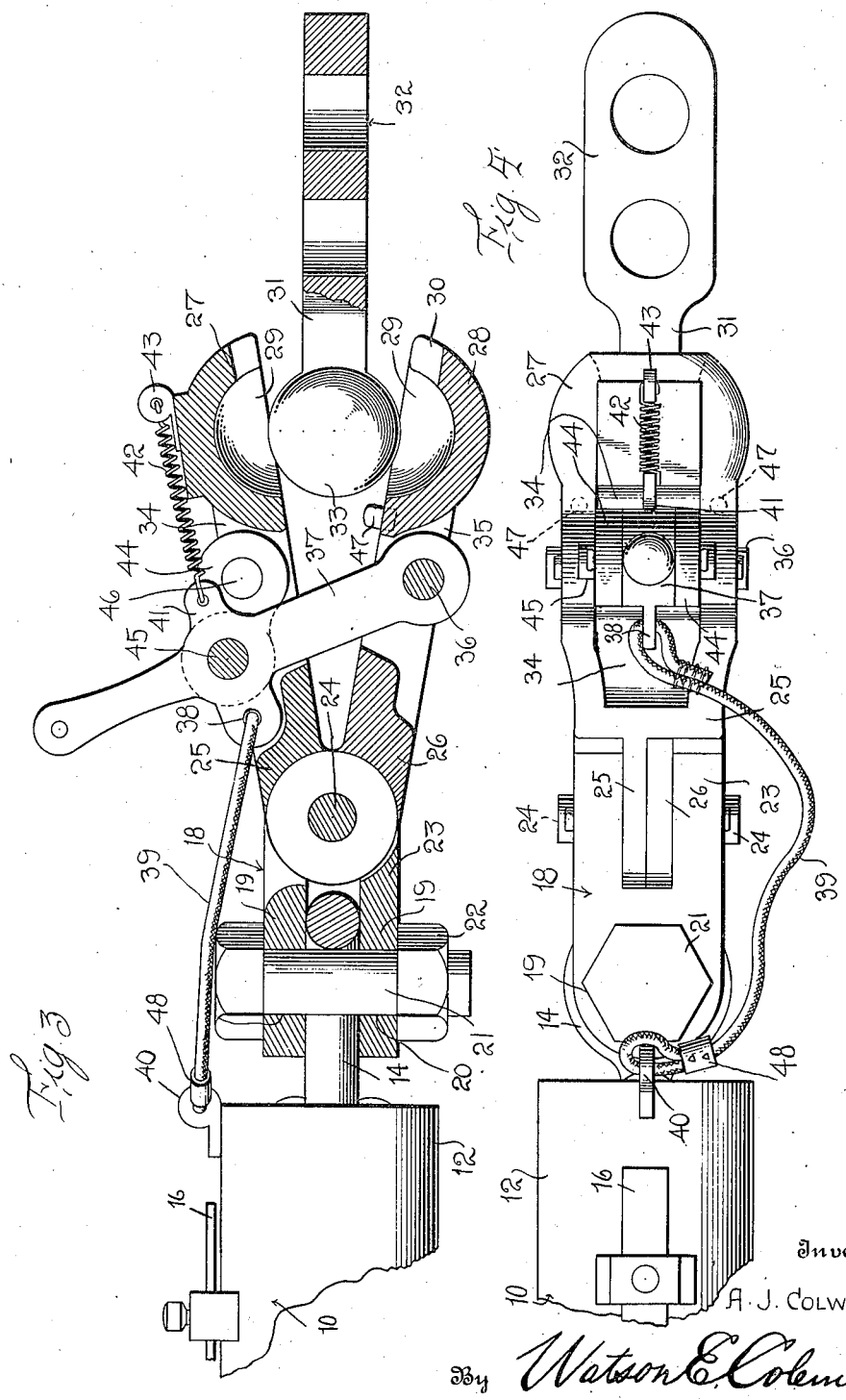

ALVAH J. COLWELL, OF NORFOLK, NEBRASKA.

AUTOMATIC DRAFT-RELEASING DEVICE FOR TRACTORS.

1,262,456.  Specification of Letters Patent.  Patented Apr. 9, 1918.

Application filed June 2, 1917. Serial No. 172,548.

*To all whom it may concern:*

Be it known that I, ALVAH J. COLWELL, a citizen of the United States, residing at Norfolk, in the county of Madison and State of Nebraska, have invented certain new and useful Improvements in Automatic Draft-Releasing Devices for Tractors, of which the following is a specification, reference being had to the accompanying drawings.

This invention relates to draft mechanism, and particularly to draft mechanism used between tractors and such implements as plows, harrows and the like designed to be drawn by the tractors.

Where plows or other like implements are drawn by tractors, if the implement strikes a stone of sufficient size, the implement will be held from forward movement while the tractor will continue to move forward thus breaking the implement. In my application filed on the 30th day of April, 1917, Serial No. 165,457, I have illustrated and described a safety draw bar of such construction that when the implement is held from forward movement by striking a stone or other obstruction, the power to the motor or engine will be immediately shut off, but in the case of tractors driven by engines having large fly wheels, considerable energy is stored in the fly wheel while the tractor is running and the engine or motor will therefore continue to run for a short period of time after the power has been shut off. In this case the tractor continues to act and the implement will be drawn forward and this would injure the plows or other implements and break them.

The object of this present invention, therefore, is to provide a draft device particularly adapted to be used in connection with the safety draw bar described in my pending application above referred to, but so constructed that a continued movement of the tractor after the power has been cut off will automatically disengage the implement from the tractor.

A further object of the invention is to provide an automatic draft release comprising jaws adapted to be manually shifted into a position to operatively engage the implement being drawn and provide a trip device operatively connected to the tractor so that when the tractor continues to move forward after the implement has been engaged by an obstruction, the trip device will act to open the jaws and thus release the implement from the tractor.

A further object of this invention is to provide a yieldable draw bar in combination with an automatic draft release connected thereto, so that when the yieldable draw bar yields beyond a predetermined amount, the automatic release will be actuated to sever the draft connection between the tractor and the implement being drawn.

A further object is to provide a construction of this character in which the draft release is formed with opposed jaws having a socket therein and to provide a draw bar hitch connected to the implement and having a ball disposed within the socket thus permitting a certain freedom of movement to the implement being drawn.

Other objects will appear in the course of the following description.

My invention is illustrated in the accompanying drawings, wherein:—

Figure 1 is a side elevation of the tractor, a plow and my improved draft device;

Fig. 2 is a side elevation of the release mechanism, the draw bar being in section;

Fig. 3 is a longitudinal sectional view of the release mechanism, the draw bar being in elevation;

Fig. 4 is a top plan view of the construction shown in Fig. 3, but showing the lever 37 in its position when the jaws are closed.

Referring to the drawings, 10 designates the spring draw bar which forms the subject matter of my previously referred to application. This draw bar essentially consists of two telescopic sections 11 and 12 inclosing a compression spring 13. A draft clevis 14 extends loosely through the head of the section 12 and is connected to the head of the section 11, while a draft clevis 15 extends loosely through the head of the section 11 and is connected to the head of the section 12. It will thus be seen that upon a stoppage of the plow or other implement being drawn by the tractor, which plow is operatively connected, as will be later described, to the clevis 14, the sections 11 and 12 will be drawn toward each other against the tension of the spring 13. Mounted upon the section 12 is a member 16, which coacts with a member 17 mounted upon the section 11, and when these sections 11 and 12 are urged toward each other by the stoppage of the implement, the member 16 will engage with my member 11 and this, as fully described in my pending application, will cut off the power of the engine. As illustrated, this is secured by electrically connecting the member 17 with the magneto, so that when the member 17 engages with the member 16, the magneto will be grounded and the ignition system will be rendered inoperative. As explained in my pending application, I do not wish to be limited to this means and I merely show it in the present case as illustrative of the operation of the device.

My improved draft release comprises a shank 18 having a forwardly extending bifurcated portion 19 providing two spaced arms formed with vertically disposed apertures 20, between which the clevis 14 is adapted to be received, this shank 18 being connected to the portion 19 by means of a clevis bolt 21 having a head at one end and a nut 22 at the other end. The shank 18 is formed with two laterally spaced arms 23, apertured for the passage of a transverse pivot pin 24. Pivotally mounted upon this pin 24 are the rear ends of the shanks 25 and 26 of the upper and lower jaws 27 and 28 respectively. Each of these jaws 27 and 28 is formed with an approximately hemispherical socket 29, these sockets confronting each other, the sockets being formed at their free ends to provide an aperture 30 when the sockets are closed, this aperture or throat being adapted to receive the reduced neck 31 of a hitch bar 32, this hitch bar having a globular end 33 adapted to be engaged in the sockets 29. As before stated, the forward ends of the shanks 25 and 26 are formed to bear upon each other and have rotative engagement upon the pin 24 and between the arms 23 of the shank 18. Rearward of the jaw 27, the shank 25 is cut out or formed with an opening 34 and a like opening 35 is formed rearward of the jaw 28.

Pivoted upon a pin 36 on the shank 26 is the lower end of a trip lever 37, which passes upward through the opening 35 and also passes through the opening 34 in the shank 25. This lever 37 is also provided with an eye 38 which is adapted to be connected to a trip cord 39. This cord 39 extends forward and is connected to an eye 40 carried upon the section 12 of the safety draw bar. This lever 37 is also formed with an eye 41 operatively connected to a coil spring 42, in turn connected to an eye 43 formed upon the jaw 27.

Embracing the lever 37 are laterally disposed toggle links 44, these toggle links being pivoted to the lever 37 by means of a transverse pin 45 and being pivoted in the walls of the opening 34 and to the shank 25 by means of a transverse pin 46. It will now be obvious that when the upper end of the lever 37 is shifted rearward, the toggle links 44 will be turned into an approximately vertical position and that when the lever 37 is shifted forward, the jaws will be opened. Preferably the lever 37 moves beyond its center, that is, beyond the center of the pin 46 and this tends to lock the jaws in their closed position. The lever is yieldingly held in this locked position by means of the spring 42 and this is still further resisted by providing rubber cushions 47 disposed at the base of the jaw 28 and engaging with the base of the jaw 27.

The trip cable or chain 39 has a length greater than the distance between the eye 38 and the eye 40 when the trip lever is in a vertical position. As a consequence, when the trip lever is in its normal or vertical position, the trip cable or chain will be slack. If, however, the plow, which is connected to the draw bar hitch 32, is obstructed in its forward movement, the first action will be to urge the sections 11 and 12 of the draw bar toward each other against the force of the spring 13. In other words, the section 10 will move forward, but the releasing mechanism will be stationary. The moving forward of the section 12 will tighten the cable 39 and as soon as this cable has become tightened to a predetermined extent, it will draw the trip lever over from its vertical position to the position shown in Fig. 3, which will release the jaws, thus disconnecting the plow or other implement being drawn from the tractor and preventing the plow from being broken. The automatic mechanism actuated by the members 16 and 17 on the draw bar 10 will have previously acted to cut off power to the tractor, so that the tractor will move only a short distance before it stops and then the obstacle to the movement of the plows may be removed, the plows or other implements drawn forward or the tractor moved backward, and the hitch again made. This is accomplished by drawing the trip lever forward until the ball on the draw bar hitch will enter and then the lever is pulled back into its vertical position. As the lever nears the position at which the clamps close, the rubber cushions 47 are depressed and as the lever passes the center line, the tendency is to continue, due to the upward pressure of the rubber cushion or to the spring 42 and thus the clamps or jaws are held in a closed position.

It will be seen that the pull on the draft iron or draw bar hitch 32 holds the clamp jaws 26 and 27 closed so long as the trip lever 37 is in its closed position and past the vertical center line for the toggles 44 are inclined in such a direction as to force the lever 37 farther toward the rear of the machine, as will be obvious from Fig. 2.

Preferbaly the trip cable or chain 39 is provided with clamps 48 whereby the effective length of the trip cable may be adjusted.

While I have illustrated a ball and socket joint between the draw iron or hitch 32 and this safety releasing device, yet this ball and socket joint is not absolutely necessary. It is preferable, however, as this gives a flexible joint and one which helps to hold the clamp jaws closed when the clamp is pulled and further permits of a change in the line of draft within certain limits without cramping any of the parts.

While I have illustrated the means for stopping the movement of the tractor when the plows or other implements are obstructed, this means consisting of the members 16 and 17, yet it is to be understood that any yieldable draw bar might be used with this safety release mechanism and that this safety release mechanism works very well without the means for stopping the engine of the tractor, for it will automatically release the plows or other implements before breakage occurs. It is, however, much better to use the parts 16 and 17, as in this case the power will be cut off immediately that an obstruction prevents the forward movement of the plows and before breakage occurs and this shutting off of the engine power allows the operator in many cases ample time to release the clutch or throw other machinery of the tractor out of gear to thus stop the pull on the plows before the automatic release lets go. This saves the time and trouble of backing up and hitching onto the plows again and in many cases of starting the motor over again.

While I have illustrated a construction which has been found very effective in practice, yet it will be understood that the principle of this invention may be embodied in many different forms and that I do not wish to be limited to the exact construction shown.

Having described my invention, what I claim is:—

1. In a draft releasing device for tractors, a yielding draft element, a member having clamping jaws movable toward or away from each other and adapted to be engaged with a drawn element, and means for automatically releasing said clamping jaws when the drawn element is stopped in its forward movement relative to the tractor, and including a lever connected to the jaws and a normally slack connection between the draft element and said lever.

2. In a draft releasing device for tractors, a yielding draft element adapted to be connected to a tractor, a member connected to the draft element and having coacting gripping members and adapted when closed to engage with a drawn element, and a normally slack connection operatively connected to the tractor at one end and at its other operatively connected to said gripping members to cause the release thereof when the connection is rendered taut by a stoppage of the drawn element.

3. A draft device of the character described, comprising a shank adapted to be connected to a tractor, a pair of jaw members pivotally connected to the shank and adapted when closed to operatively engage with a drawn member, a lever operatively mounted to close the jaws when shifted in one direction and open the jaws when shifted in the other direction, and a normally slack operating connection extending from said lever and adapted to be operatively connected to a tractor.

4. A draft releasing device for tractors comprising a member adapted to be operatively connected to a tractor and having jaws relatively movable toward or from each other and adapted to be engaged with an element to be drawn, a toggle link connected to said jaws to relatively shift the jaws, and a lever operatively connected to the toggle link and having a normally slack connection adapted to be operatively connected to the tractor, said connection when taut shifting the lever to cause the opening of the jaws.

5. In a draft releasing device for tractors, a draw bar composed of two sections, one of the sections adapted to be connected to a tractor, a spring resisting movement of the sections upon each other, a pair of jaws operatively connected to the other of said sections, a lever manually shiftable in one direction to cause the closing of said jaws whereby the jaws may be engaged with a drawn element, and a flexible connection leading from said lever and connected to the first named section of the draw bar and normally slack, said flexible connection when drawn taut shifting said lever to a position to open the jaws.

6. The combination with a tractor having an engine and an element drawn by said tractor, of a draw bar connected to the tractor and composed of two sections shiftable with relation to each other and a spring holding said sections yieldingly from shifting, a member operatively connecting the draw bar to the drawn element but disconnectible from the drawn element, means operatively connected to the draw bar for causing the stoppage of the engine when the members of the draw bar are shifted against the force of said spring, and means detaching said connecting member from the drawn element upon a predetermined contraction of the spring.

7. A draft releasing device for tractors comprising a shank adapted to be operatively connected to the tractor, a pair of jaws pivotally connected to the shank and extending rearward therefrom, the jaws being adapted to engage a drawn element, a lever pivoted to one of said jaws and extending beyond the other jaw, a toggle link pivoted to the lever and the second named jaw, the lever and toggle link acting to close the jaws when the lever is turned to a position approximately at right angles to the line of draft but open said jaws when the free end of the lever is shifted toward said shank, and a flexible connection leading from said lever and adapted to be operatively connected to the tractor.

8. A draft releasing device for tractors comprising a shank adapted to be operatively connected to the tractor and having approximately hemispherical jaws mounted thereon, a draft element having a spherical head adapted to be engaged by said jaws and to have a ball and socket connection therewith, a lever in one position holding said jaws closed, and a flexible connection leading from said lever and adapted to be connected to the tractor, said connection being normally slack.

9. A draft releasing device for tractors comprising a shank adapted to be operatively connected to the tractor and having approximately hemispherical jaws mounted thereon, a draft element having a spherical head adapted to be engaged by said jaws and to have a ball and socket connection therewith, a lever in one position holding said jaws closed, a flexible connection leading from said lever and adapted to be connected to the tractor, said connection being normally slack, and resilient means urging said lever to a position to hold the jaws closed.

10. In a draft releasing device for tractors, a shank bifurcated at one end and having a transverse bolt at this end, a pair of coacting jaws having forwardly extending shranks pivoted to said first named shank, the jaws being movable toward or from each other and the shanks having openings therethrough, a lever pivoted upon one of said large shanks and extending through the opening of the other shank, a toggle link pivoted to said lever and to the last named jaw shank, and a flexible normally slack connection attached to said lever and adapted to be operatively connected to the tractor.

11. In a draft releasing device for tractors, a shank bifurcated at one end and having a transverse bolt at this end, a pair of coacting jaws having forwardly extending shanks pivoted to said first named shank, the jaws being movable toward or from each other and the shanks having openings therethrough, a lever pivoted upon one of said large shanks and extending through the opening of the other shank, a toggle link pivoted to said lever and to the last named jaw shank, and a flexible normally slack connection attached to said lever and adapted to be operatively connected to the tractor, said lever being movable in one direction beyond its center and the center of connection between the link and the large shank, whereby to lock the lever against the opening of the jaws.

12. In a draft releasing device for tractors, a shank bifurcated at one end and having a transverse bolt at this end, a pair of coacting jaws having forwardly extending shanks pivoted to said first named shank, the jaws being movable toward or from each other and the shank having openings therethrough, a lever pivoted upon one of said large shanks and extending through the opening of the other shank, a toggle link pivoted to said lever and to the last named jaw shank, a flexible normally slack connection attached to said lever and adapted to be operatively connected to the tractor, said lever being movable in one direction beyond its center and the center of connection between the link and the large shank, whereby to lock the lever against the opening of the jaws, and resilient means urging the lever into its locked position.

In testimony whereof I hereunto affix my signature in the presence of two witnesses.

ALVAH J. COLWELL.

Witnesses:
  L. P. PASEWALK,
  D. MATHEWSON.